(12) United States Patent
Plantan

(10) Patent No.: US 6,360,649 B1
(45) Date of Patent: Mar. 26, 2002

(54) SPRING BRAKE ACTUATOR

(75) Inventor: Ronald S. Plantan, Charlotte, NC (US)

(73) Assignee: Indian Head Industries, Inc., Charlotte, NC (US)

( * ) Notice: Subject to any disclaimer, the term of this patent is extended or adjusted under 35 U.S.C. 154(b) by 0 days.

(21) Appl. No.: 09/558,521

(22) Filed: Apr. 26, 2000

(51) Int. Cl.$^7$ ................................................ F01B 19/04

(52) U.S. Cl. ............................................................ 92/99

(58) Field of Search ........................... 92/63, 99, 130 R, 92/130 D

(56) References Cited

U.S. PATENT DOCUMENTS

| | | |
|---|---|---|
| 2,448,981 A | 9/1948 | Ingres |
| 2,467,517 A | 4/1949 | Almond |
| 2,504,691 A | 4/1950 | Ingres |
| 2,992,630 A | 7/1961 | Leighton et al. |
| 3,020,094 A | 2/1962 | Murty et al. |
| 3,101,133 A | 8/1963 | House et al. |
| 3,101,219 A | 8/1963 | Herrera |
| 3,107,583 A | 10/1963 | Woodward |
| 3,112,959 A | 12/1963 | Kateley |
| 3,117,496 A | 1/1964 | Dobrikin |
| 3,131,609 A | 5/1964 | Dobrikin et al. |
| 3,244,079 A | 4/1966 | Herrera |
| 3,285,672 A | 11/1966 | Avrea |
| 3,291,004 A | 12/1966 | Stevenson et al. |
| 3,331,291 A | 7/1967 | Rumsey |
| 3,380,349 A | 4/1968 | James |
| 3,439,585 A | 4/1969 | Herrera |
| 3,450,008 A | 6/1969 | Fites |
| 3,502,003 A | 3/1970 | Dobrikin et al. |
| 3,508,470 A | 4/1970 | Swander, Jr. et al. |
| 3,515,438 A | 6/1970 | Stevenson et al. |
| 3,548,720 A | 12/1970 | Swander, Jr. et al. |
| 3,630,093 A | 12/1971 | Morse et al. ........... 92/63 |
| 3,696,711 A | 10/1972 | Berg et al. |
| 3,710,692 A | 1/1973 | Valentine ............... 92/63 |
| 3,719,125 A | 3/1973 | Cannella |
| 3,730,056 A | 5/1973 | Swander, Jr. |
| 3,736,842 A | 6/1973 | Valentine ............... 92/63 |
| 3,744,123 A * | 7/1973 | Vers ....................... 29/522 |
| 3,800,668 A | 4/1974 | Valentine ............... 92/63 |
| 3,811,365 A | 5/1974 | Gordon et al. |
| 3,908,520 A | 9/1975 | Ma |
| 3,926,094 A | 12/1975 | Kurichh et al. |
| 4,031,814 A | 6/1977 | Lukens et al. |
| 4,043,251 A | 8/1977 | Ohmi |
| 4,263,840 A | 4/1981 | Herrera |
| 4,303,006 A | 12/1981 | Burke et al. |
| 4,353,291 A | 10/1982 | Hauduc |
| 4,565,120 A | 1/1986 | Gray et al. |
| 4,640,135 A | 2/1987 | Kästel et al. |
| 4,664,016 A | 5/1987 | Tobisawa et al. |
| 4,850,263 A | 7/1989 | Rumsey et al. |
| 4,936,758 A | 6/1990 | Coble |
| 4,945,818 A | 8/1990 | Ware |
| 4,960,036 A | 10/1990 | Gummer et al. |
| 5,002,164 A | 3/1991 | Bowyer |
| 5,016,523 A | 5/1991 | Bowyer |
| 5,067,391 A | 11/1991 | Choinski et al. |

(List continued on next page.)

Primary Examiner—F. Daniel Lopez
(74) Attorney, Agent, or Firm—Howard & Howard

(57) ABSTRACT

An improved spring brake actuator which combines the advantages of piston and diaphragm-type brake actuators having superior performance at reduced cost. The improved spring brake actuator includes a tubular flexible diaphragm having one end secured between the rim portions of the cup-shaped housing and cover and an inverted second end portion which is received around the rim portion of a cup-shaped piston and secured in sealed relation with a flexible band. The power spring is received within opposed cup-shaped portions of the piston and cover and the rim portion of the piston is biased against a generally radial portion of the cover permitting use of a power spring having increased performance.

17 Claims, 3 Drawing Sheets

U.S. PATENT DOCUMENTS

| | | |
|---|---|---|
| 5,105,727 A | 4/1992 | Bowyer |
| 5,193,432 A | 3/1993 | Smith |
| 5,205,205 A | 4/1993 | Choinski et al. |
| 5,263,403 A | 11/1993 | Choinski et al. |
| 5,311,809 A | 5/1994 | Choinski et al. |
| 5,315,918 A | 5/1994 | Pierce |
| 5,320,026 A | 6/1994 | Pierce |
| 5,345,858 A | 9/1994 | Pierce |
| 5,353,688 A | 10/1994 | Pierce et al. |
| 5,372,059 A | 12/1994 | Pierce et al. |
| 5,377,579 A | 1/1995 | Pierce |
| 5,433,138 A | 7/1995 | Choinski et al. |
| 5,771,774 A * | 6/1998 | Stojic .................. 92/98 D |

* cited by examiner

SPRING BRAKE ACTUATOR

FIELD OF THE INVENTION

This invention relates to spring brake actuators as used by large vehicles having pneumatic braking systems which include a power spring and serve as an emergency brake and a parking brake.

BACKGROUND OF THE INVENTION

Spring brake actuators having a power spring are mandated to actuate the pneumatic braking system of vehicles having large inertial mass, including trucks, buses and tractor-trailers, to brake the vehicle when the pneumatic braking system fails preventing a runaway vehicle. The spring brake actuator also serves as a parking brake when the vehicle is turned off. Such spring brake actuators typically include a cup-shaped housing and a cup-shaped cover or head having a rim portion which is secured to a rim portion of the housing forming a spring or emergency chamber, a reciprocal piston and a power spring located between the cover and the piston which actuates the braking system of the vehicle when the pneumatic pressure in the spring chamber falls below a predetermined pressure. The spring brake actuator is typically combined with a service chamber which actuates the vehicle braking system during normal braking operation, wherein the housing of the emergency chamber is an H-shaped flange case and the service chamber is enclosed by a cup-shaped service chamber housing. Because of the danger of inadvertent opening of the emergency chamber having the power spring, the cover or head is secured to the housing or flange case by permanent defamation as disclosed in U.S. Pat. No. 4,960,036 assigned to the assignee of the present application.

At present, there are two general types of spring brake actuators, including piston-type spring brake actuators and diaphragm-type spring brake actuators. In piston-type spring brake actuators, the piston includes a peripheral seat which seals against the internal surface of the emergency chamber as disclosed, for example, in U.S. Pat. Nos. 5,636,562 and 5,623,863, assigned to the assignee of the present application. Diaphragm-type spring brake actuators include a flexible cup-shaped diaphragm having a peripheral rim portion secured between the opposed rim portions of the cover and the housing which is biased against the power spring piston by a separate spring piston, as disclosed in the above-referenced U.S. Pat. No. 4,960,036. Each type of spring brake actuator has important advantages. Piston-type spring brake actuators have superior performance because of the increased available space for the power spring, permitting the use of a larger power spring. The diaphragm-type spring brake actuator, as disclosed in the above-referenced U.S. Pat. No. 4,960,036, is preferred in many applications because of its reduced cost and size. Both types of spring brake actuators are generally combined with a service chamber having a flexible cup-shaped diaphragm as disclosed, for example, in the above-referenced patents.

The improved spring brake actuator of this invention combines the advantages of diaphragm and piston-type spring brake actuators, including improved performance, reduced cost and reduced size.

SUMMARY OF THE INVENTION

The spring brake actuator of this invention includes a generally cup-shaped housing, which may be the upper portion of a flange case, a cover portion having a rim portion secured to a rim portion of the housing, forming an enclosed spring or emergency chamber, a reciprocal piston located within the spring chamber having a peripheral rim portion spaced from an internal surface of the spring chamber, a power spring located within the spring chamber, between the cover and the piston, and a tubular flexible diaphragm having one end portion secured between the rim portions of the housing and the cover and a second end portion received around and secured in sealed relation to the peripheral rim portion of the piston to reciprocate with the piston when the power spring expands to brake the vehicle. In the preferred embodiment of the spring brake actuator of this invention, the second end portion of the tubular flexible diaphragm is inverted, such that the exterior surface of the tubular diaphragm is received around the peripheral rim portion of the piston and the second end portion of the diaphragm is secured to the peripheral rim portion of the piston by a flexible band, such as a continuous wire or nylon cord. In the most preferred embodiment, the interior surface of the second inverted end portion of the diaphragm includes a groove which receives the flexible retaining band and the exterior surface of the piston includes a groove opposite the flexible band which provides further securement. The exterior surface of the inverted tubular flexible diaphragm includes one or a plurality of integral sealing rings or lips which improve sealing of the diaphragm to the piston. Further, in the most preferred embodiment, the exterior surface of the piston which receives the diaphragm is generally frustoconical, further improving the sealing of the diaphragm against the piston.

In the most preferred embodiment of the spring brake actuator of this invention, the piston includes an annular cup-shaped portion which opens toward the cover and receives one end of the power spring and the cover includes a generally radially extending portion which receives the rim of the cup-shaped portion of the piston when the piston is biased against the cover by pneumatic pressure in the emergency chamber. This configuration reduces the stress on the cover and increases the space available for the power spring, permitting the use of a more powerful power spring, thereby improving performance. Further, the cup-shaped annular portion of the piston includes a generally flat bottom wall which nests against the bottom wall of the housing or radial web of a flange case, permitting a longer stroke for the piston. In the most preferred embodiment, the cover includes a cup-shaped portion adjacent the generally radially extending portion, further increasing the volume available for the power spring. The rim portion of the cover is most preferably secured to the rim portion of the housing by an integral skirt portion having a free end which is permanently deformed around a rim portion of the housing and the first end of the tubular flexible diaphragm extends longitudinally and preferably includes an integral bead spaced from the free end which is received within a groove in the housing, providing a secured sealed connection between the housing and the cover.

The improved spring brake actuator of this invention thus combines the advantages of piston and diaphragm-type spring brake actuators, providing improved performance, as compared to conventional diaphragm-type spring brake actuators, and reduced cost and size, as compared to piston-type spring brake actuators. Other advantages and meritorious features of the spring brake actuator of this invention will be more fully understood from the following description of the preferred embodiments, the claims and the appended drawings, a brief description of which follows.

DETAILED DESCRIPTION OF THE PREFERRED EMBODIMENTS

Figure 1:
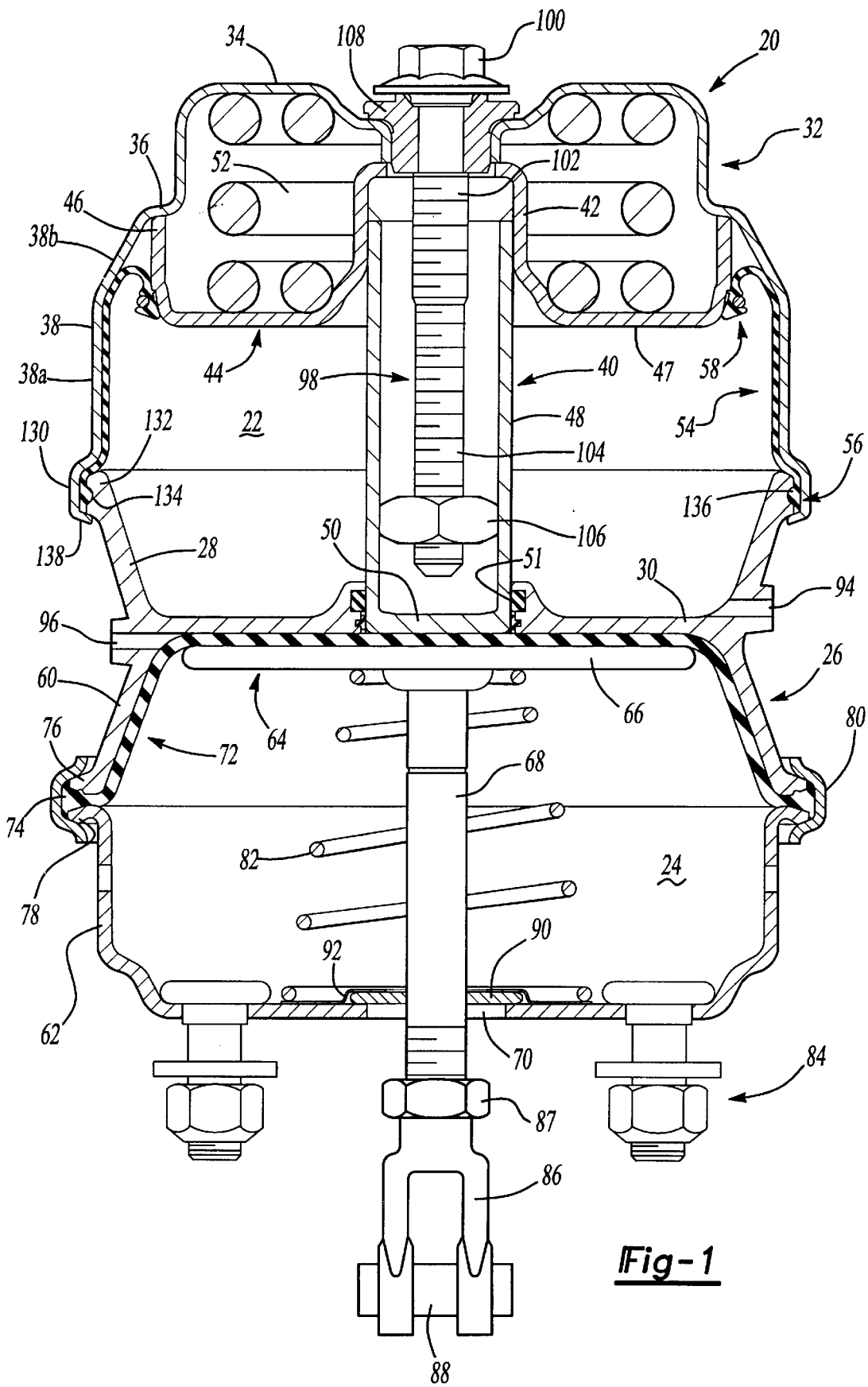
FIG. 1 is a side partially cross-sectioned view of one preferred embodiment of the spring brake actuator of this invention with the power spring compressed.
Figure 2:
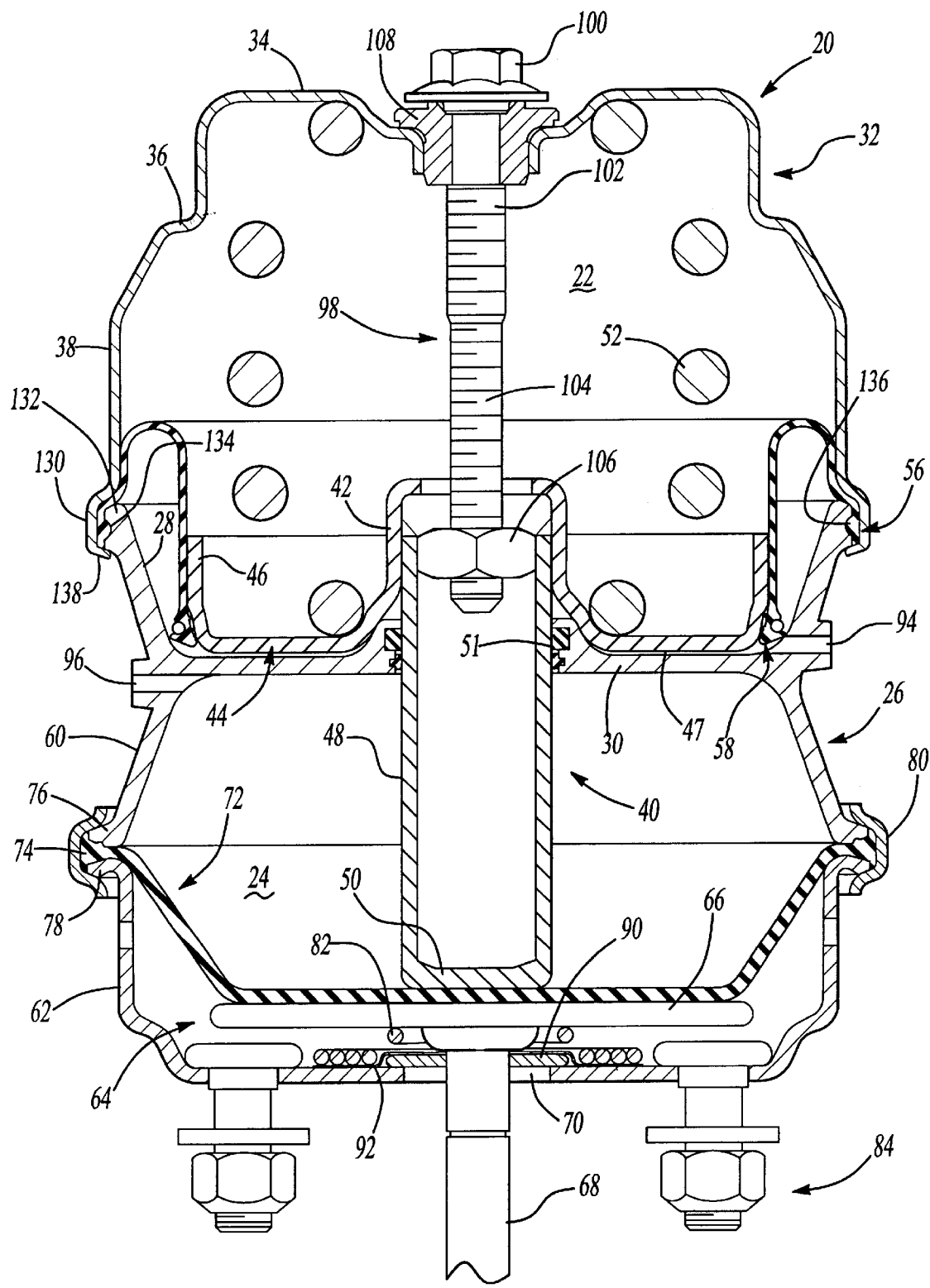
FIG. 2 is a partially cross-sectioned side view, similar to FIG. 1, with the power spring expanded.

FIGS. 1 and 2 illustrate a tandem spring brake actuator 20 incorporating an embodiment of the spring brake actuator of this invention. The disclosed embodiment of the tandem spring brake actuator 20 includes a spring or emergency chamber 22 and a service chamber 24. The central flange case 26 includes a cup-shaped housing portion 28 and a central web portion 30 which define the cup-shaped housing of the spring brake actuator of this invention. The emergency chamber is enclosed by a cover or head 32 which, in the most preferred embodiment, includes a cup-shaped central portion 34, a generally radial portion 36 and a rim portion 38 which is attached to the cup-shaped housing portion 28 as described below. The emergency chamber 22 includes a piston 40 which includes a tubular central portion 42 and an annular cup-shaped portion 44 having a rim portion 46 and a generally flat bottom wall 47. As shown in FIG. 1, the rim portion 46 engages the generally radial portion 36 of the cover 32 when the service chamber 22 is pressurized as discussed below. In the most preferred embodiment, the generally radial portion 36 is frustoconical, extending at an angle of between about 110° to 130° to the rim of the cup-shaped portion 34 and the rim 38 is bowed outwardly, as shown. The piston 40 further includes a tubular piston rod 48 having a bottom wall 50. The tubular piston rod 48 is secured to the tubular portion 42 of the piston by any suitable means including tack welding or an interference fit. The service chamber 22 further includes a power spring 52 having one end portion biased against the cup-shaped central portion 34 of the cover and an opposed end is biased against the bottom wall 47 of the annular cup-shaped portion 44 of the piston 40. The emergency chamber further includes a tubular flexible diaphragm 54 having one end 66 secured between the rim portion 38 of the cover and the end of cup-shaped portion 28 of the flange case 26 in sealed relation as described below. The flexible diaphragm 54 further includes a second end portion 58 which is secured to the rim portion 46 of the piston 40 in sealed relation as described below.

The service chamber 24 is defined in the disclosed embodiment by an integral cup-shaped portion 60 of the flange case 26 and the cup-shaped service chamber housing 62. The service chamber 24 includes a piston 64 having a piston plate 66 and a piston rod 68 which reciprocates through an opening 70 in the housing. The service chamber 24 further includes a cup-shaped flexible diaphragm 72 having a peripheral rim portion 74 secured between the flange 76 on the flange case 26 and the flange 78 on the service chamber housing 60. During assembly, the flanges 76 and 78 are compressed against the enlarged peripheral rim portion 74 of the diaphragm and secured in place by a conventional clamp 80 or other means. The service chamber further includes a return spring 82 which is biased against the piston plate 66. In a typical application the service chamber 24 is secured to a bracket (not shown) beneath the vehicle chassis by mounting bolts 84. The free threaded end of the piston rod 68 is threadably secured to a clevis 86 by lock nut 87 and the clevis 86 is attached to the braking system of the vehicle (not shown) by clevis pin 88. In a typical application, an annular stone shield 90 is received within the service chamber 24 and retained by a stamped stone shield retainer 92. As will be understood, the stone shield 90 prevents the entry of road debris into the service chamber 24 as the piston rod 68 reciprocates through the housing opening 70.

The general operation of the tandem spring brake actuator 20 may now be described. During normal operation of the vehicle, air pressure is received through port 94 in the flange case 26, pressurizing the spring or emergency chamber 22 The pressure in the emergency chamber 22 reacts against the cup-shaped portion 44 of the piston 40 and the diaphragm 54 to maintain the piston and diaphragm as shown in FIG. 1. During normal braking of the vehicle, air pressure is received through port 96, inverting the cup-shaped flexible diaphragm 72, driving the piston plate 66 downwardly in FIG. 1, driving the piston rod 68 through the opening 70 in the housing and actuating the braking system of the vehicle (not shown). In a conventional braking system, the clevis 86 is attached to a slack adjuster (not shown) of the vehicle braking system by clevis pin 88. Upon release of the brake pedal, the pressure in port 96 returns to zero and the return spring 82 reacts against the piston plate 66, returning the piston 64 and the diaphragm 72 to the position shown in FIG. 1. In the event that the pressure in the emergency chamber 22 falls below a predetermined pressure, such as a loss of pressure in the pneumatic braking system, the power spring 52 expands, driving the piston 40 downwardly in FIG. 1 through the opening 51 in the web 30 against the diaphragm 72 and the piston plate 66, actuating the braking system of the vehicle as described above. Thus, the spring brake actuator, which includes the components of the service chamber 22, serves as a parking brake for the vehicle when the vehicle is turned off or as an emergency brake in the event that the pneumatic pressure falls below a predetermined pressure.

As set forth above, the emergency chamber 22 may comprise a separate housing and the components described or the spring brake actuator may be a tandem spring brake actuator 20 as shown in FIG. 1. In a separate emergency chamber, the flange case 26 would be replaced with a cup-shaped housing member similar to the cup-shaped portion 28 and web 30 shown in FIG. 1. The disclosed embodiment of the tandem spring brake actuator 20 further includes a lockout bolt assembly 98 which cages the power spring 52 to permit towing of the vehicle when the emergency chamber 22 is not pressurized. The lockout bolt assembly 98 may be similar to the assembly disclosed in the above-referenced U.S. Pat. No. 5,623,863. In the disclosed embodiment, the lockout bolt 98 includes a hexagonal head 100, a first threaded portion 102 and a second threaded portion 104 having a diameter smaller than the first threaded portion 102 which is threadably received into nut 106. The nut 106 cannot turn relative to the tubular piston rod 48 of the piston 40 because the tubular portion is hexagonal. The first threaded portion is threaded into a nut 108 which is fixed relative to the cup-shaped portion 34 of the cover 32. Rotation of the head 100 thus threads the nut 106 upwardly on the threaded portion 100, lifting the piston 40 upwardly and caging the spring 52. The vehicle can then be towed because the brakes are released. In view of the fact that the lockout bolt assembly 98 does not form part of the present invention and is described in the above-referenced U.S. patent, no further description is required in this application.

Figure 3:
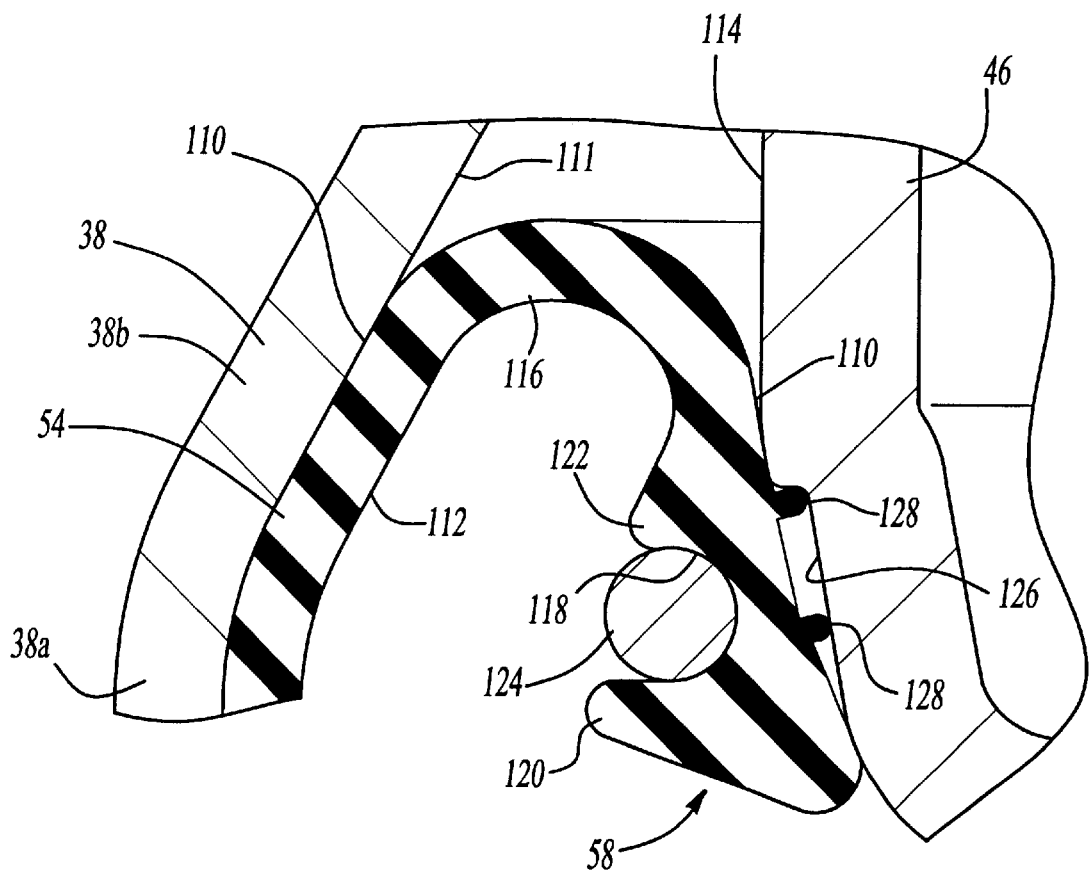
FIG. 3 is an enlarged side cross-sectional view of the connection between the diaphragm and the piston in FIG. 1.

FIG. 3 illustrates the unique attachment of the diaphragm 54 to the rim portion 46 of the piston 40. The tubular flexible diaphragm 54 includes an external surface which overlies the internal surface 111 of the frustoconical portion 38b of the cover and an internal surface 112. The second end portion 58 of the diaphragm is then inverted as shown in FIG. 3, such that the external surface 110 overlies and surrounds a portion of the external surface 114 of the tm portion 46 of the piston. The diaphragm further includes a free looped or inverted portion 116 located between the portion overlying the internal surface 111 of the frustoconical portion 38b of the cover and the external surface 114 of the rim portion 46 of the piston. The internal surface 112 of the second end portion 58 of the diaphragm 54 includes an annular U-shaped groove 118 and upstanding lips 120 and 122 which receive a continuous flexible wire or cord 124 in the form of a continuous loop or circle. In the preferred embodiment, the external surface 114 of the rim 46 includes a frustoconical portion 126 which defines a groove opposite the retaining wire or cord 124 and the external surface 110 includes integral annular fibs 128 which are biased against the frustoconical surface 126 as shown in FIG. 3. The wire 124 may be a braided or solid metal wire or a nylon cord wherein the ends are joined. The wire 124 is assembled in the groove 118 prior to assembly of the second end portion 58 on the rim portion 46 of the piston. The wire 124 and second end portion 58 is then pressed upwardly into the conical surface 126 as shown in FIG. 3. The second end portion 58 of the flexible diaphragm 54 is thus sealed against the external surface 114 of the rim portion of the piston. A unique feature of this assembly is the fact that the greater the pressure against the internal surface 112 of the diaphragm, the better the seal. That is, the pressure in the emergency chamber 22 will react against the inverted portion 116 of the diaphragm, pressing the seals 128 against the frustoconical portion 126, improving the seal. As shown in FIG. 2, the second end portion 58 of the diaphragm reciprocates with the piston 40, maintaining the seal during reciprocal movement of the piston as described above.

As briefly described above, the rim portion 38 of the cover 32 is secured to the rim portion 28 of the housing preferably by permanent defamation to prevent inadvertent opening of the emergency chamber 22 and release of the power spring 52. In the preferred embodiment of the spring brake actuator of this invention, the rim portion 38 of the cover includes an integral annular longitudinally extending skirt-like rim portion 130 which is received around the flange portion 132 of the rim portion 28 of the flange case; a tubular portion 38a and a first frustoconical portion 38b. The tubular portion 38a is continuous with the rim portion 130 and the first frustoconical portion 38b. The first frustoconical portion 38b is continuous with the frustoconical radial portion 36. The flange portion 132 includes an annular groove 134 which receives a radial integral rib 136 on the internal surface of the tubular flexible diaphragm, preferably spaced from the flee end, as shown, and the tubular diaphragm preferably extends longitudinally between the opposed surfaces of the flange 132 and the skirt portion 130). The free end 138 of the skirt portion 130 is then deformed radially inwardly, permanently attaching the rim portion 38 of the cover to the rim portion 28 of the housing or flange case with the end portion 56 of the tubular flexible diaphragm providing an improved sealed connection.

As will be understood, the components of the spring brake actuator of this invention may be formed of various materials. The flange case 26 may be formed of cast aluminum as is presently conventional. The cover or head 32 may be formed of steel, as is presently conventional, or may also be formed of stamped aluminum because of the unique design of the head 32 and the piston 40 as disclosed herein. More specifically, the support of the rim portion 46 of the piston by the generally radial portion 36 of the head reduces the stress and thus the structural requirements of the head, and the improved skirt portions 130 extends generally axially, rather than radially. The cup-shaped flexible diaphragm 72 in the service chamber 24 is conventional and therefore may be formed of conventional materials including synthetic rubber, such as Neoprene, having a fabric mesh core reinforcement. The improved tubular flexible diaphragm 54 in the spring chamber of this invention may also be formed of the same material. The strap or wire retainer 124 is a continuous flexible loop and may be formed of wire, braided wire or nylon cord. The piston assembly 40 may be formed of stamped metal including steel or aluminum. As set forth above, the rim portion 46 is preferably frustoconical, wherein the angle is between 70 and 85 degrees relative to the generally flat bottom wall 47. The remainder of the components may be formed of conventional materials as is known in the art.

As set forth above, the spring brake actuator of this invention combines the advantages of piston and diaphragm-type spring brake actuators. That is, the spring brake actuator of this invention provides improved performance or "parking force" when compared to conventional diaphragm spring brake actuators in a smaller package and reduced cost compared to piston-type spring brake actuators. The space provided for the power spring 52 by the cup-shaped portion 34 on the cover and the cup-shaped annular portion 44 of the piston provide an increased volume when compared to conventional diaphragm-type spring brake actuators, permitting the use of a larger power spring 52. Further, as set forth above, the generally radial portion 36 on the cover, which is engaged by the rim portion 46 of the piston, provides both improved integrity for the cover or head and reduced stress. The pneumatic pressure in the emergency or spring chamber 22 is resisted only by the power spring. Further, the flat bottom wall 47 of the piston fully nests in the central web 30 of the flange case permitting increased stroke for the tubular piston rod 48. Finally, as set forth above, the greater the air pressure in the emergency chamber 22, the tighter the seal between the second end portion 58 of the tubular gasket 54 against the rim portion 46 of the piston.

As will be understood, various modifications may be made to the improved spine brake actuator of this invention within the purview of the appended claims. For example, the spring brake chamber 22 may be separate from the service chamber 24. Further, the lockout bolt assembly 98, which does not form part of the present invention, may be any conventional lockout assembly. The tubular piston rod 48 may be secured to the tubular portion 42 by any conventional method or formed integrally with the annular cup-shaped portion 44 of the piston. Having described a preferred embodiment of the spring brake actuator of this invention, the invention is now claimed as follows.

What is claimed is:

1. A spring brake actuator including a cup-shaped housing, a cover having a rim portion secured to a rim portion of said cup-shaped housing forming an enclosed spring chamber, a reciprocal piston located within said spring chamber having a peripheral rim portion spaced from an interior surface of said spring chamber, a power spring located within said spring chamber between said cover and said piston, and a tubular flexible diaphragm having one open end portion secured between said rim portions of said housing and said cover and a second inverted end portion received around said peripheral rim portion of said piston having an outer annular groove, and a flexible band encircling said inverted end portion of said flexible diaphragm received in said annular groove and retaining said inverted end portion of said diaphragm to said piston in sealed relation.

2. The spring brake actuator defined in claim 1, wherein said piston includes a cup-shaped portion opening toward said cover and receiving said power spring and said peripheral rim portion extending toward an end portion of said cover, and said second end portion of said tubular flexible diaphragm received around an outer surface of said tubular rim portion of said piston and secured thereto in sealed relation.

3. The spring brake actuator defined in claim 2, wherein said second end portion of said flexible tubular diaphragm is secured to said outer surface of said peripheral rim portion of said piston by flexible continuous wire surrounding said second end portion of said flexible tubular diaphragm and received in said annualar groove.

4. The spring brake actuator defined in claim 3, wherein said peripheral rim portion outer surface of said piston is generally frustoconical.

5. The spring brake actuator defined in claim 3, wherein said piston peripheral rim portion includes an annular groove and said flexible band is received around said second end portion of said flexible tubular diaphragm opposite said groove.

6. The spring brake actuator defined in claim 1, wherein said one end portion of said diaphragm extends longitudinally between said rim portions of said cover and said housing and said cover rim portion permanently deformed around said rim portion of said housing.

7. The spring brake actuator as defined in claim 1, wherein said flexible band has a generally circular cross section and said groove is generally semi-circular.

8. The spring brake actuator as defined in claim 1, wherein said inverted end portion of said diaphragm includes an inner surface facing, said peripheral rim portion of sad piston including a rib engaging, said peripheral rim portion of said piston in sealed relation.

9. The spring brake actuator defined in claim 1, wherein said cover includes a cup-shaped midportion receiving an end of said power spring, a generally radial intermediate portion and said rim portion, and said piston having a cup-shaped portion opening toward and receiving an opposed end of said power spring, wherein an end portion of said piston cup-shaped portion is normally biased against said generally radial intermediate portion of said cover by pneumatic pressure in said spring chamber.

10. The spring brake actuator defined in claim 9, wherein said generally radial intermediate portion of said cover is frustoconical.

11. A spring, brake actuator, comprising:
a cup-shaped housing having a rim portion;
a cover including a cup-shaped portion having a rim portion, a tubular portion continuous with said rim portion, a first frustoconical portion second frustoconical portion continous with the first frustoconial portion; wherein said rim portion of said cover is secured to said rim portion of said housing forming an enclosed spring chamber;
a reciprocal piston located within said spring chamber including a cup-shaped portion opening toward said cup-shaped portion of said cover having a tubular rim portion spaced from an internal surface of said spring chamber having an external diameter equal to a diameter of said first frustoconical portion of said cover;
a power spring located within said spring chamber between said cup-shaped portions of said cover and said piston;
a tubular flexible diaphragm having one open end portion secured between said rim portions of said housing and said cover, an intermediate portion overlying said tubular portion and said first frustoconical portion of said cover when said power spring is compressed between said cup-shaped portions of said cover and said piston and a second inverted open end portion secured to an outer surface of said tubular rim portion of said piston by a flexible band encircling said second inverted open end portion of said tubular flexible diaphragm and tightened against an inner surface of said second inverted end portion sealing said inverted end portion against said tubular rim portion of said piston; and
whereby pneumatic pressure in said spring chamber biases said tubular rim portion of said piston against said first frustoconical portion of said cover and said intermediate portion of said diaphragm against said tubular portion and second frustoconical portion of said cover, and expansion of said power spring drives said cup-shaped portion of said piston against an opposed surface of said housing and said second inverted open end portion of said diaphragm opens and follows said piston.

12. The spring brake actuator defined in claim 11, wherein said inverted second end portion of said flexible tubular diaphragm is secured to said outer surface of said peripheral rim portion of said piston by a flexible band surrounding said outer surface of said flexible tubular diaphragm.

13. The spring brake actuator defined in claim 12, wherein said flexible band is a continuous wire.

14. The spring brake actuator defined in claim 12, wherein said outer surface of said piston peripheral rim portion is generally frustoconical.

15. The spring brake actuator defined in claim 12, wherein said outer surface of said piston peripheral rim portion includes an annular groove and said flexible band is received around said inverted second end portion of said flexible tubular diaphragm opposite said groove in said piston peripheral rim portion.

16. The spring brake actuator defined in claim 11, wherein said one end portion of said tubular flexible diaphragm extends longitudinally between said rim portions of said cover and said housing, and said cover rim portion permanently deformed around said rim portion of said housing.

17. The spring brake actuator defined in claim 16, wherein said one end portion of said diaphragm includes an integral radial rib and said housing rim portion includes a groove receiving said radial rib portion of said diaphragm.

* * * * *